United States Patent [19]
Sundberg et al.

[11] Patent Number: 5,470,166
[45] Date of Patent: Nov. 28, 1995

[54] SHAFTING CONNECTION

[75] Inventors: Staffan Sundberg, Hofors, Sweden;
Vilaly E. Sergeev; Vladimir G. Nesterov, both of Sankt Petersburg, U.S.S.R.

[73] Assignee: Ovako Couplings AB, Sweden

[21] Appl. No.: 153,757

[22] Filed: Nov. 17, 1993

[30] Foreign Application Priority Data

Dec. 29, 1992 [SE] Sweden .................................. 9203922

[51] Int. Cl.$^6$ ........................................................ F16B 2/00
[52] U.S. Cl. ........................... 403/314; 403/292; 403/305; 403/409.1; 403/404
[58] Field of Search .................................... 403/314, 305, 403/300, 351, 367, 374, 409.1, DIG. 8, 292, 293, 294, 308, 320, 342, 404, 405.1; 285/178, 421

[56] References Cited

U.S. PATENT DOCUMENTS

| | | | |
|---|---|---|---|
| 712,047 | 10/1902 | Dean | 403/314 X |
| 954,957 | 4/1910 | Harriman, Jr. et al. | 403/351 X |
| 1,214,985 | 2/1917 | Barber | 403/409.1 X |
| 1,281,284 | 10/1918 | Brunson | 403/314 |

FOREIGN PATENT DOCUMENTS

| | | | |
|---|---|---|---|
| 321387 | 6/1920 | Germany | 403/293 |
| 197705 | 12/1977 | U.S.S.R. | 403/351 |
| 617617 | 7/1978 | U.S.S.R. | 285/178 |
| 632840 | 11/1978 | U.S.S.R. | |
| 657191 | 4/1979 | U.S.S.R. | |
| 812651 | 3/1981 | U.S.S.R. | |
| 857590 | 8/1981 | U.S.S.R. | |
| 865693 | 9/1981 | U.S.S.R. | |

*Primary Examiner*—Eric K. Nicholson
*Assistant Examiner*—Harry C. Kim
*Attorney, Agent, or Firm*—Ostrolenk, Faber, Gerb & Soffen

[57] ABSTRACT

A press fit joint shafting connection for hollow cylindrical steel shafts has shaft end faces provided with eccentrically arranged axial recesses wider than the main shaft bores. An annular toughened steel locking insert having an eccentrically arranged through bore is retained in the space formed by the eccentrically arranged bores when the shaft ends meet. The degree of eccentricity of the bore in the locking insert corresponds to that of the eccentrically arranged shaft recesses while the locking insert bore diameter corresponds to the diameter of the main shaft bores. The inner bores with free lumen are in alignment in a mounted state. A corresponding shafting method is also described.

16 Claims, 2 Drawing Sheets

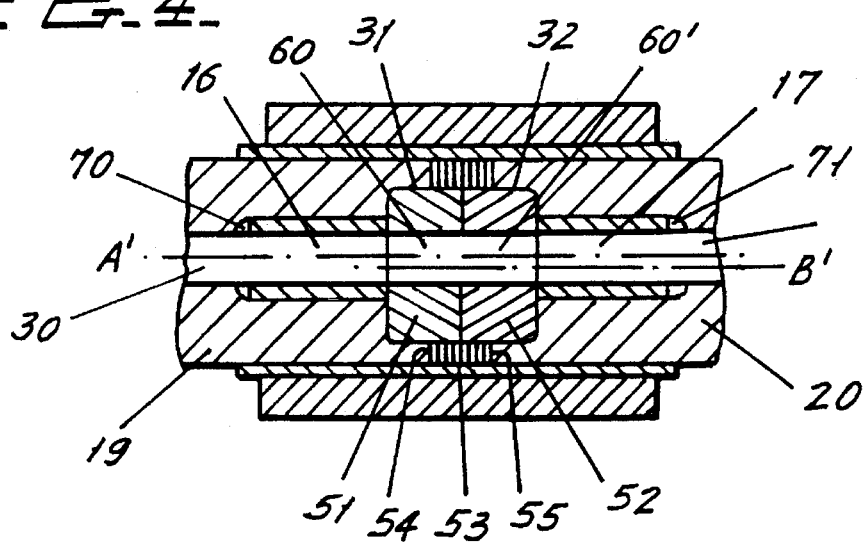
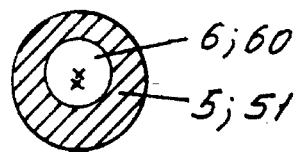
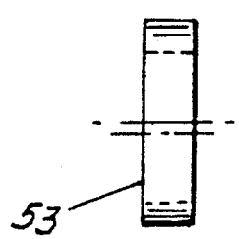 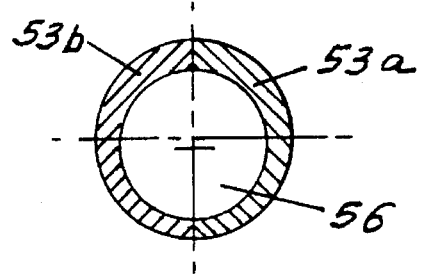

SHAFTING CONNECTION

BACKGROUND OF THE INVENTION

The present invention relates to a shafting connection and, more particularly, to a shafting connection for connecting a first hollow steel shaft to a second hollow steel shaft, the shafts having identical outer diameters at least in regions extending from their abutting ends, comprising a friction coupling including an inner sleeve with an inner cylindrical surface arranged for frictional contact with the outer surface of the terminal region of the shafts, the friction coupling being arranged to be fitted on the aligned shafts to cover both shafts near their abutting ends, each of the shafts in a region extending from their abutting ends having a second concentric bore of same diameter for receiving an annular insert, said second bores being wider than the main shaft bores, the diameters of the second bores being essentially identical. Such connections are used, i.e., for the shafting of a controllable pitch propeller and similar devices.

Both solid and hollow marine shafts are usually connected to each other by means of press fit joints; see, e.g., published Swedish patent application No. 353 374 (application No. 8838/68). Such joints are sleeves which are fitted around the abutting cylindrical shaft ends, comprising inner and outer sleeve members with co-acting tapered surfaces. Hydraulic means are used for their assembly/disassembly. The torque transmission capacity of cylindrical shafts with or without cylindrical inner bores connected by press fit couplings solely depends on frictional force between the individual parts of the shafting assembly. Deformation of sleeve and shafts at high torque results in loss of friction and makes the shafts slip.

The transmission of high torque by hollow shafts shafted in this way constitutes a particular problem since hollow shafts are more easily deformed than solid shafts. To achieve torque transmission rates for hollow shafts comparable to those of solid shafts of same width, the former have to be reinforced by sleeves of toughened steel sunk into recesses turned beneath the coupling seatings, cf. "The OK couplings from OVAKO STEEL", brochure No. K1-189, page 13, OVAKO STEEL Coupings AB, 1988. For hollow shafts with an inner diameter/outer diameter ratio exceeding 0,55, even normal torque cannot be fully transmitted. Since a torque transmission safety factor against slipping of more than 2,5 of the normal torque is required by most marine classification authorities, specifications cannot be met with the known shafting connection even for shafts with that diameter ratio falling substantially below the 0,55 value. Furthermore, for a given application, it is desirable to decrease the shaft diameter while keeping maximum torque transmission values constant. In respect of shafts as such, this can be achieved by use of high quality alloyed steel. Such improvement however, is not parallelled by an increased efficiency of the now smaller press fit joint. Also for this reason, improvement of torque transmission efficiency of press fit joints is desirable.

SUMMARY OF THE INVENTION

It is thus an object of the present invention to provide a shafting connection for hollow steel shafts that has torque transmission properties superior to those known in the art.

In accordance with the present invention, a shafting connection for hollow steel shafts is provided which improves torque transmission by 20 to 50 % compared with traditional shafting connections for shafts of same dimensions.

According to the present invention there is provided a shafting connection for connecting a first hollow steel shaft to a second hollow steel in which the second bores in the butt faces of the shafts for receiving a cylindrical insert are arranged with equal eccentricity in respect to the main shaft bores.

The annular insert which is a locking insert advantageously has substantial extension in both second bores and has an eccentrically arranged through bore, the degree of eccentricity essentially corresponding to that of the eccentrically arranged second bores in the respective shaft. It is preferred for the bore diameter of said annular locking insert to essentially correspond to the diameter of the main shaft bore.

According to an advantageous aspect of the invention by which the zone of increased shaft stability is extended further along the shafts, an intermediate bore is arranged between the eccentrically arranged bore extending from the end of the respective shaft and the main shaft bore and being in alignment with the latter, and which intermediate bore has a diameter larger than the diameter of the main shaft bore but smaller than the outer diameter of the eccentrically arranged annular locking insert.

Into the intermediate bore a symmetric annular sleeve insert is fitted having an outer diameter essentially corresponding to the diameter of the intermediate bore, an inner diameter essentially corresponding to the diameter of the main shaft bore and having an axial extension not exceeding that of the intermediate bore.

It is preferred for the annular locking insert to be made of toughened steel with a yield point of at least 850N/mm$^2$. It is also preferred for the symmetric annular insert to be made of toughened steel with a yield point of at least 850N/mm$^2$. It is furthermore preferred for the bore of the annular locking insert to have an eccentricity corresponding to 10–30% of the outer diameter of said insert.

According to a preferred aspect of the invention, the ratio of length to outer diameter of the annnular locking insert is 2.0:1.0–0.75:1.0, more preferred 1.7:1:0–1,1:1,0, most preferred about 1.4:1.0.

A preferred embodiment of the invention in which the interface zone where the shafts meet is further strengthened comprises two pairs of matching annular locking insert halves mirroring each other and joining each other face-to-face, one each arranged in each second bore, the axial extension of each of the bores being substantially less than the axial extension of the respective annular locking insert half, the locking insert halves in their portions external of the second bores being surrounded eccentrically by a cylindrical mounting element interspaced between the abutting ends of the shafts and having a bore diameter corresponding to the second shaft bore diameter and an outer diameter corresponding to the diameter of the shaft, the eccentricity of the cylindrical mounting element corresponding to that of the second bore. The mounting element is preferably made of toughened steel.

It is advantageous for the bore of the annular locking insert halves to have an eccentricity corresponding to 10–30% of the outer diameter of the insert, for the length to outer diameter ratio of the combined annular locking insert halves to be 3.0:1.0–0.5:1.0, and for the ratio of inner to outer diameter of the mounting element to be 0,6–0,85. The annular locking insert halves and the mounting element are preferably made of toughened steel.

Furthermore, in accordance with the invention, there is provided an annular locking insert or insert half for a shafting connection of hollow steel shafts having an eccentrically arranged through bore.

According to a particularly advantageous aspect of the invention, the mounting element comprises two about half moon-shaped element halves mirroring each other in an axial plane. This arrangement allows the shafting connection to be disassembled without need for pulling the shafts apart.

It is a further object of the invention to provide a method for shafting two cylindrical hollow shafts having a main centrally arranged bore.

According to the present invention, the shafting method comprises the following steps: (a) providing in the butt faces of the shafts eccentric cylindrical second bores extending in the direction of the shaft axis, (b) fitting a first annular locking insert having an eccentrically arranged bore into one of said second bores, (c) aligning said one main shaft bore with the bore of said first annular locking insert, (d) axially displacing one of the shafts in the direction of the other shaft until abutment, followed or preceded by alignment of the inner bores of the assembly, (e) fitting a Dress fit joint over the the shafts ends and activating the joint.

It is preferred for the shaft bores and the annular locking insert bore to be kept in alignment while fitting and activating the press fit joint.

According to a preferred aspect of the method according to the invention, cylindrical intermediate bores are provided between the second bores and the main shaft bores, with which they are aligned, and cylindrical symmetric sleeve inserts are fitted into the intermediate bores prior to step (b). According to a further preferred aspect of the method according to the invention, prior to step (d) a second annular locking insert mirroring the first annular locking insert is fitted into the eccentrically arranged bore of the other shaft and a cylindrical mounting element having an eccentrically arranged bore is slid over one of the cylindrical inserts.

According to another preferred aspect of the invention, the method further includes the steps of fitting a second annular locking insert mirroring the first annular locking insert into the eccentrically arranged bore of the other shaft, and of fitting two about half moon-shaped mounting element halves around the annular locking insert, which steps are preceded by or consecutive to step (d), respectively.

BRIEF DESCRIPTION OF THE DRAWINGS

The invention will now be explained in more detail by reference to preferred embodiments illustrated in drawings, in which:

FIG. 4 is a longitudinal section through a fourth preferred embodiment in a mounted state, FIG. 5 is a section perpendicular to the axis of the locking insert and the locking insert half of the first and second, and third and fourth embodiments, respectively, FIG. 6 is a preferred aspect of the mounting element of the third and fourth preferred embodiment, FIG. 7 is an axial end view of the object in FIG. 6

DETAILED DESCRIPTION OF THE PREFERRED EMBODIMENT(S)

Figure 1:
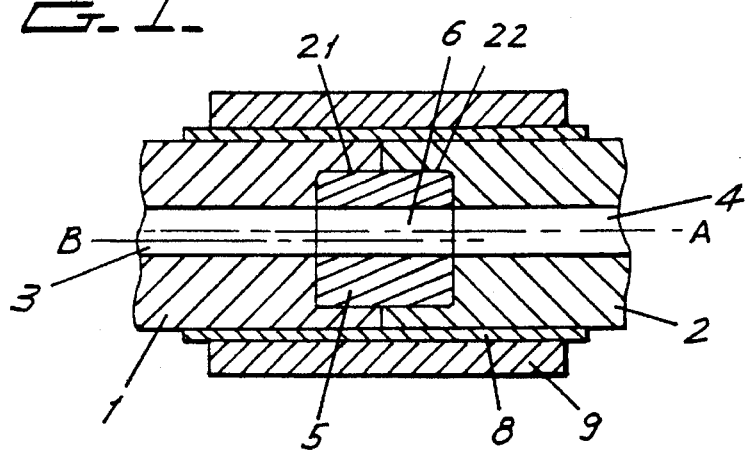
FIG. 1 is a longitudinal section through a first preferred embodiment in a mounted state.

Two cylindrical propeller steel shafts 1, 2 with central bores 3, 4, (axis A) are aligned and abutting with their flat faces (FIG. 1). The end portions of the shafts 1, 2 have eccentrically arranged (axis B) cylindrical recesses 21, 22. The cylindrical space thus formed is occupied by a snugly fitting locking insert 5 of toughened steel with an eccentrically arranged through bore 6 of same diameter as the main shaft bores 3, 4. The bores 3, 4, and 6 are in alignment. The shafts 1, 2 are surrounded by an activated pressure fit joint assembly indicated in the Figures by inner and outer sleeves 8, 9 tapering at their interface but otherwise cylindrical. The sleeves 8, 9 are axially centered at the interface between the shafts 1, 2. The compression exerted by the pressure fit joint assembly stabilizes the shafts 1, 2 and thus their connection.

Figure 2:
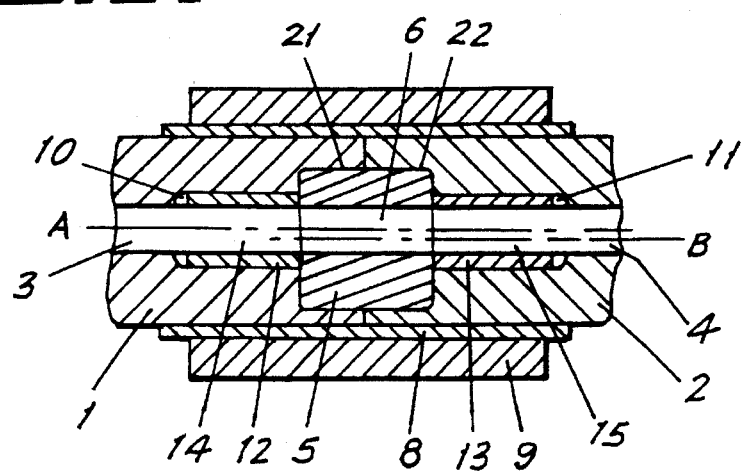
FIG. 2 is a longitudinal section through a second preferred embodiment in a mounted state.

The embodiment shown in FIG. 2 differs from that in FIG. 1 in that further bores or recesses 10, 11 with a diameter larger than that of the main shaft bores 3, 4 but smaller than that of the recesses 21, 22 are arranged concentrically in respect of the main shaft bores 3, 4 and in alignment with them. The bores 10, 11 are extending axially from the inner end of recesses 21, 22. Their extension is approximately matching that of the axial extension of the press fit joint assembly 8, 9. Cylindrical sleeve inserts or sockets 12, 13 of toughened steel are fitted into bores 10, 11. The lumen 14, 15 of the inserts 12, 13 essentially corresponds to that of the main shaft bores 3, 4.

Figure 3:
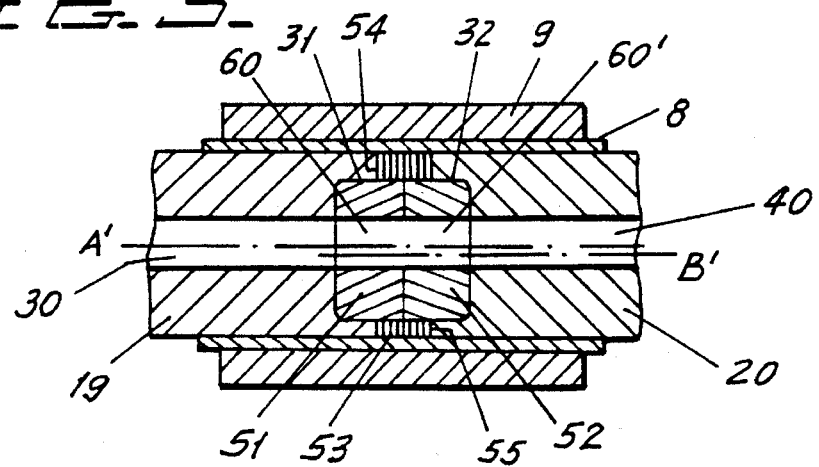
FIG. 3 is a longitudinal section through a third preferred embodiment in a mounted state.

The embodiment shown in FIG. 3 has an annular locking element consisting of mirroring halves 51, 52 occupying eccentrically arranged shallow recesses 31, 32 in the end faces 54, 55 of the cylindrical shafts 19, 20 (axis A') and raising above faces 54, 55. The annular locking element halves 51, 52 have respective eccentrically arranged through bores 60, 60' and are in abutting contact with each other while the shaft end faces 54, 55 are spaced apart. The interstice between faces 54, 55 is occupied by an annular mounting element 53 of toughened steel having an eccentrically arranged bore 56 (axis B'). The outer diameter of the annular mounting element 53 thus corresponds to that of the shafts 10, 20 whereas its inner diameter corresponds to the outer diameter of the annular locking insert halves 51, 52.

The embodiment shown in FIG. 4 differs from that in FIG. 3 in that bores or recesses 70, 71 with a diameter larger than that of the main shaft bores 30, 40 but smaller than that of the shallow recesses 31, 32 are arranged concentrically in respect of the main shaft bores 30, 40 and in alignment with them. The bores 70, 71 are extending axially from the inner end of recesses 31, 32. Their extension is approximately matching that of the axial extension of the press fit joint assembly 8, 9. Hollow cylindrical inserts or sockets 16, 17 of toughened steel are fitted into bores 70, 71. The lumen 14, 15 of the inserts 12, 13 essentially correspond to that of the main shaft bores 30, 40.

As shown in FIGS. 6 and 7, the mounting element 53 may comprise two symmetric halves 53a and 53b. This enables the connection to be partially disassembled without pulling the shafts apart.

It is not required for the entire cylindrical hollow shafts to be of same outer and inner diameter; it suffices for their end portions at which they are joined to fulfill that requirement. A precision fit of the individual parts of the shafting connection assembly is a prerequisite for optimal function.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. Shafting connection for connecting a first hollow cylindrical steel shaft to an aligned second hollow cylindrical steel shaft, said shafts having respective main bores and identical outer diameters at least in regions extending from their abutting ends, comprising a friction coupling including an inner sleeve with an inner cylindrical surface arranged for frictional contact with the outer surface of a terminal region of the shafts, said friction coupling being arranged to be fitted on the aligned shafts to cover both shafts near their abutting ends, each of said shafts in a region extending from their abutting ends having a second bore of same diameter for receiving an annular insert, said second bores being wider than the main shaft bores and being arranged with equal eccentricity in respect to the main shaft bores, said annular insert being an annular locking insert having substantial extension in both second bores and having an eccentrically arranged through bore having a bore diameter, the degree of eccentricity essentially corresponding to that of the eccentrically arranged bore in the respective shaft.

2. Shafting connection according to claim 1, characterized in that the bore diameter of said annular locking insert essentially corresponds to the diameter of the main shaft bores.

3. Shafting connection according to claim 1, characterized in that between the eccentrically arranged bore extending from the end of the respective shaft and the symmetrically arranged main shaft bore, an intermediate bore is arranged having an axis coinciding with the main shaft bore axis and having a diameter larger than the diameter of the main shaft bore but smaller than the outer diameter of the annular locking insert, into which intermediate bore a symmetric sleeve insert is fitted having an outer diameter essentially corresponding to the diameter of the intermediate bore, an inner diameter essentially corresponding to the diameter of the main shaft bore and an axial extension not exceeding that of said intermediate bore.

4. Shafting connection according to claim 3, characterized in that said symmetric sleeve insert is made of toughened steel with a yield point of at least 850N/mm$^2$.

5. Shafting connection according to claim 1, characterized in that the annular locking insert is made of toughened steel with a yield point of at least 850N/mm$^2$.

6. Shafting connection according to claim 1, characterized in that the bore of the annular locking insert has an eccentricity corresponding to 10–30% of the outer diameter of the insert.

7. Shafting connection according to claim 1, characterized in that the ratio of length to outer diameter of the annular locking insert is 2.0:1.0–0.75:1.0.

8. Shafting connection according to claim 1, characterized in that the ratio of length to outer diameter of the annular locking insert is 1.7:1.0–1.1:1.0.

9. Shafting connection according to claim 1, characterized in that the ratio of length to outer diameter of the annular locking insert is about 1.4:1.0.

10. Shafting connection according to claim 1, characterized in that said annular locking insert comprises two parts of matching locking insert halves mirroring each other and joining each other face-to-face, each half arranged in each second bore, the axial extension of each of said bores being substantially less than the axial extension of the respective locking insert half, said locking insert halves in their portions external of said second bores being surrounded by a cylindrical mounting element interspaced between the abutting ends of said shafts and having an inner bore diameter corresponding to said second shaft bore diameter and an outer diameter corresponding to the diameter of the shaft, the eccentricity of the mounting element corresponding to that of said second bore.

11. Shafting connection according to claim 10, characterized in that the bore of the annular locking insert halves has an eccentricity corresponding to 10–30% of the outer diameter of the insert.

12. Shafting connection according to claim 10, characterized in that the ratio of length to outer diameter of the combined annular locking insert halves is 3.0:1.0–0.5:1.0.

13. Shafting connection according to claim 10, characterized in that the ratio of inner to outer diameter of the mounting element is 0,6–0,85.

14. Shafting connection according to claim 10, characterized in that the annular locking insert halves and the mounting element are made of toughened steel.

15. Shafting connection according to claim 10, characterized in that the mounting element comprises two about half moon-shaped element halves mirroring each other in an axial plane.

16. Shafting connection according to claim 1, characterized in that the annular locking insert has an eccentrically arranged through bore.

* * * * *